United States Patent
Yun

(10) Patent No.: US 11,315,236 B2
(45) Date of Patent: Apr. 26, 2022

(54) METHOD AND APPARATUS FOR QUALITY ASSURANCE OF AUTOMOBILE COMPONENT USING MARKER

(71) Applicant: KOREA UNIVERSITY OF TECHNOLOGY AND EDUCATION INDUSTRY-UNIVERSITY COOPERATION FOUNDATION, Cheonan-si (KR)

(72) Inventor: Han-Kyung Yun, Seongnam-si (KR)

(73) Assignee: KOREA UNIVERSITY OF TECHNOLOGY AND EDUCATION INDUSTRY-UNIVERSITY COOPERATION FOUNDATION, Cheonan-Si (KR)

(*) Notice: Subject to any disclaimer, the term of this patent is extended or adjusted under 35 U.S.C. 154(b) by 28 days.

(21) Appl. No.: 16/955,000

(22) PCT Filed: Dec. 18, 2018

(86) PCT No.: PCT/KR2018/016082
§ 371 (c)(1),
(2) Date: Jun. 17, 2020

(87) PCT Pub. No.: WO2019/124919
PCT Pub. Date: Jun. 27, 2019

(65) Prior Publication Data
US 2020/0394788 A1    Dec. 17, 2020

(30) Foreign Application Priority Data
Dec. 18, 2017 (KR) .................... 10-2017-0174258

(51) Int. Cl.
G06T 7/00 (2017.01)
G06T 3/00 (2006.01)

(52) U.S. Cl.
CPC .......... *G06T 7/0006* (2013.01); *G06T 3/0006* (2013.01); *G06T 7/001* (2013.01);
(Continued)

(58) Field of Classification Search
CPC ...... H04N 5/23293; H04N 5/243; G09G 3/32; G06T 7/254; G06T 7/50; G06K 9/6226;
(Continued)

(56) References Cited

U.S. PATENT DOCUMENTS

2013/0335533 A1* 12/2013 Yamazaki .......... H04N 9/04555
348/49

FOREIGN PATENT DOCUMENTS

| JP | 3021333 U | 11/1995 |
| JP | 2005-43248 A | 2/2005 |

(Continued)

*Primary Examiner* — Phuoc H Doan
(74) *Attorney, Agent, or Firm* — Lewis Roca Rothgerber Christie LLP

(57) ABSTRACT

The present disclosure relates to a method and an apparatus for assuring quality of a component, and more particularly, to a method and an apparatus for quality assurance of an automobile component using a marker, that can remove human error and apply a user-oriented display method, by utilizing image analysis techniques, such as a compensation technique according to shooting distance of a high-resolution camera of a terminal having a shooting function, a reference measurement technique where a marker itself includes information such as spatial information and measurement specifications and the like, and distortion correction of a taken image.

11 Claims, 9 Drawing Sheets

(52) U.S. Cl.
CPC ............... *G06T 2207/30164* (2013.01); *G06T 2207/30204* (2013.01)

(58) Field of Classification Search
CPC .......... G06F 3/14; G06F 1/163; G06F 3/0484; G06F 3/0482; G06F 3/04845; G06F 3/04842; G02B 27/0172
USPC .......................................... 382/141; 345/212
See application file for complete search history.

(56) References Cited

FOREIGN PATENT DOCUMENTS

| | | |
|---|---|---|
| JP | 2008-224484 A | 9/2008 |
| JP | 6116486 B2 | 4/2017 |
| KR | 10-0269116 B1 | 11/2000 |
| KR | 10-2010-0025048 A | 3/2010 |
| KR | 10-2011-0087407 A | 8/2011 |
| KR | 10-2011-0089519 A | 8/2011 |
| KR | 10-2015-0125243 A | 11/2015 |
| KR | 10-1631841 B1 | 6/2016 |

\* cited by examiner

[FIG. 1]
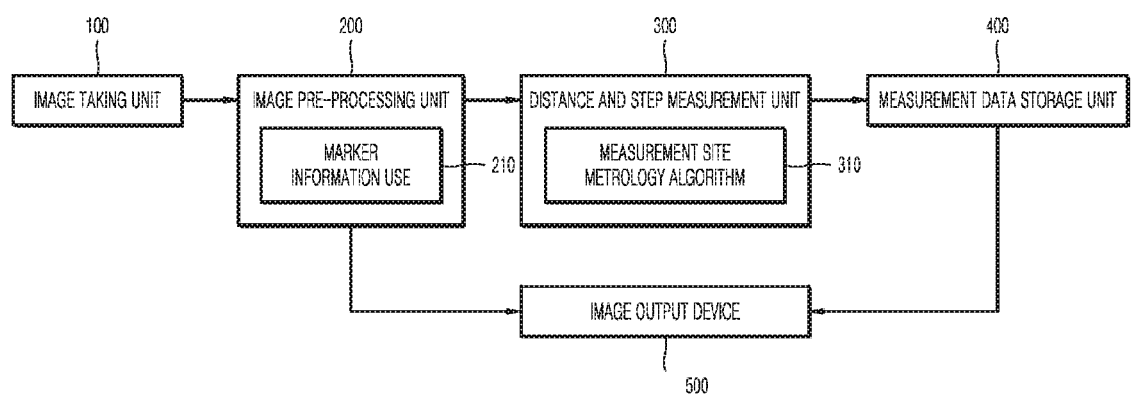

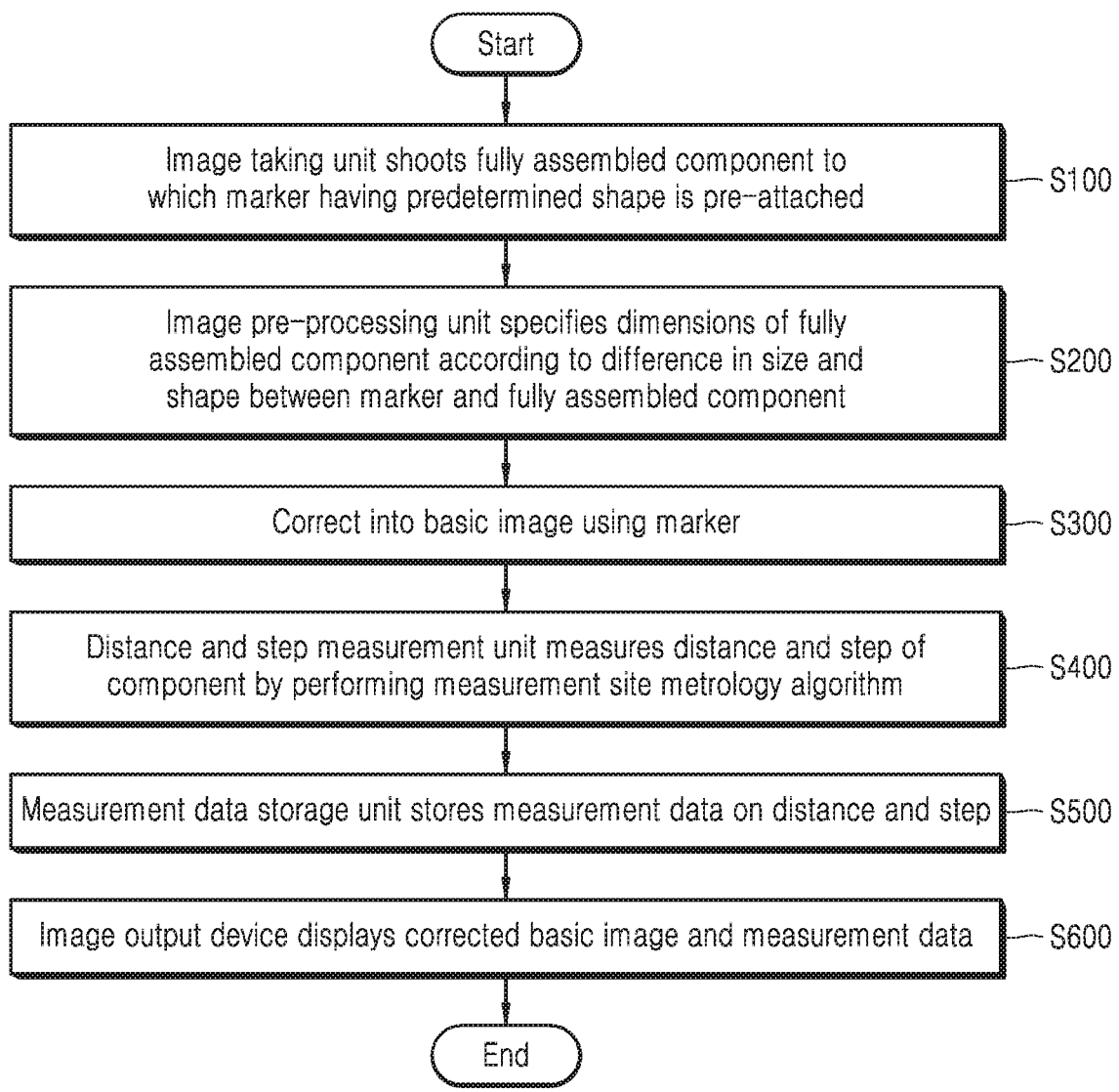

[FIG. 3]
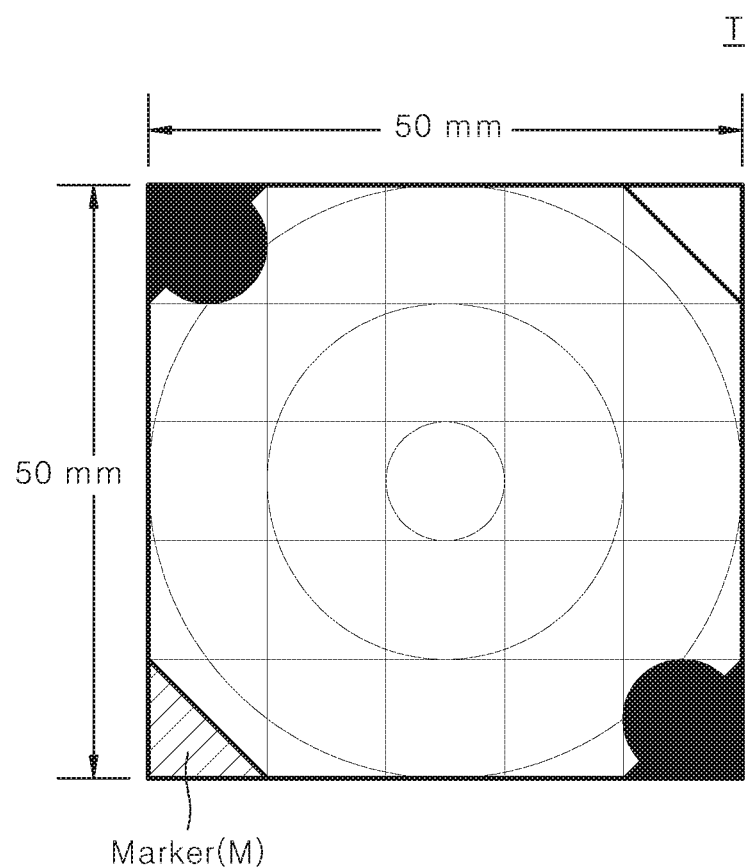

[FIG. 4]
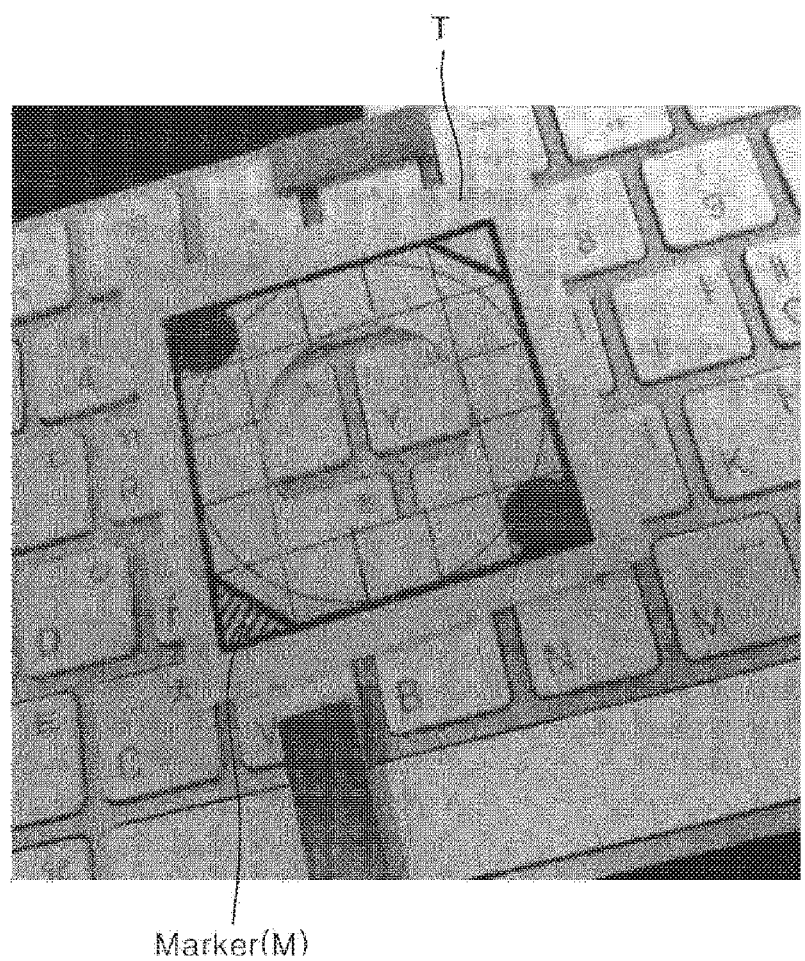

[FIG. 5]
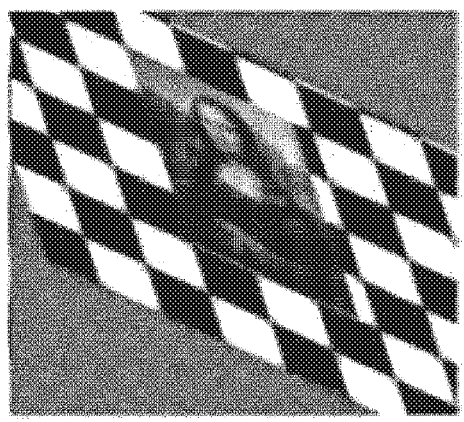
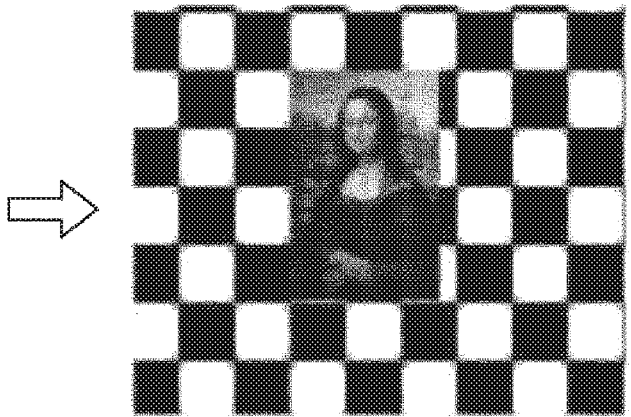
(a)  (b)

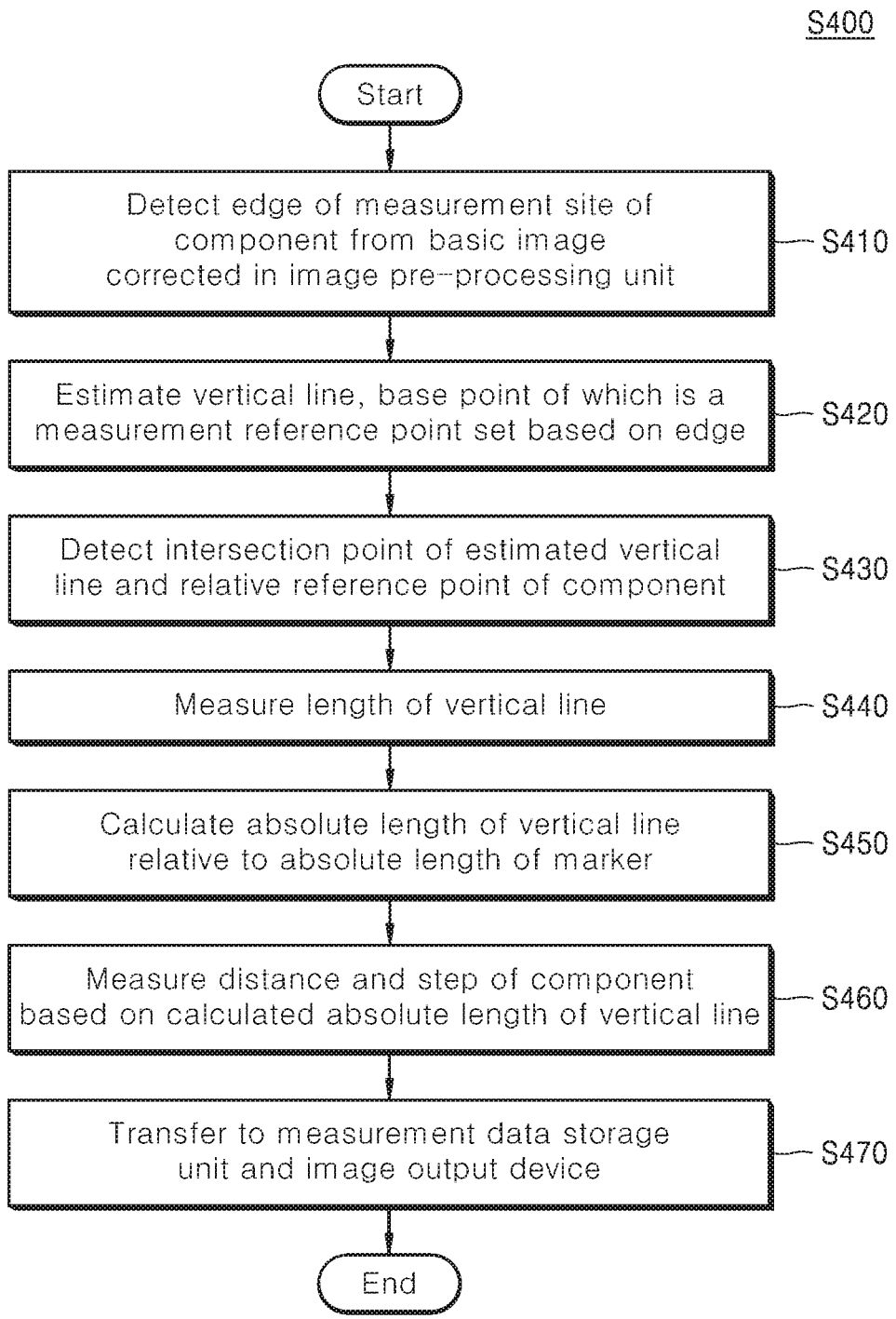

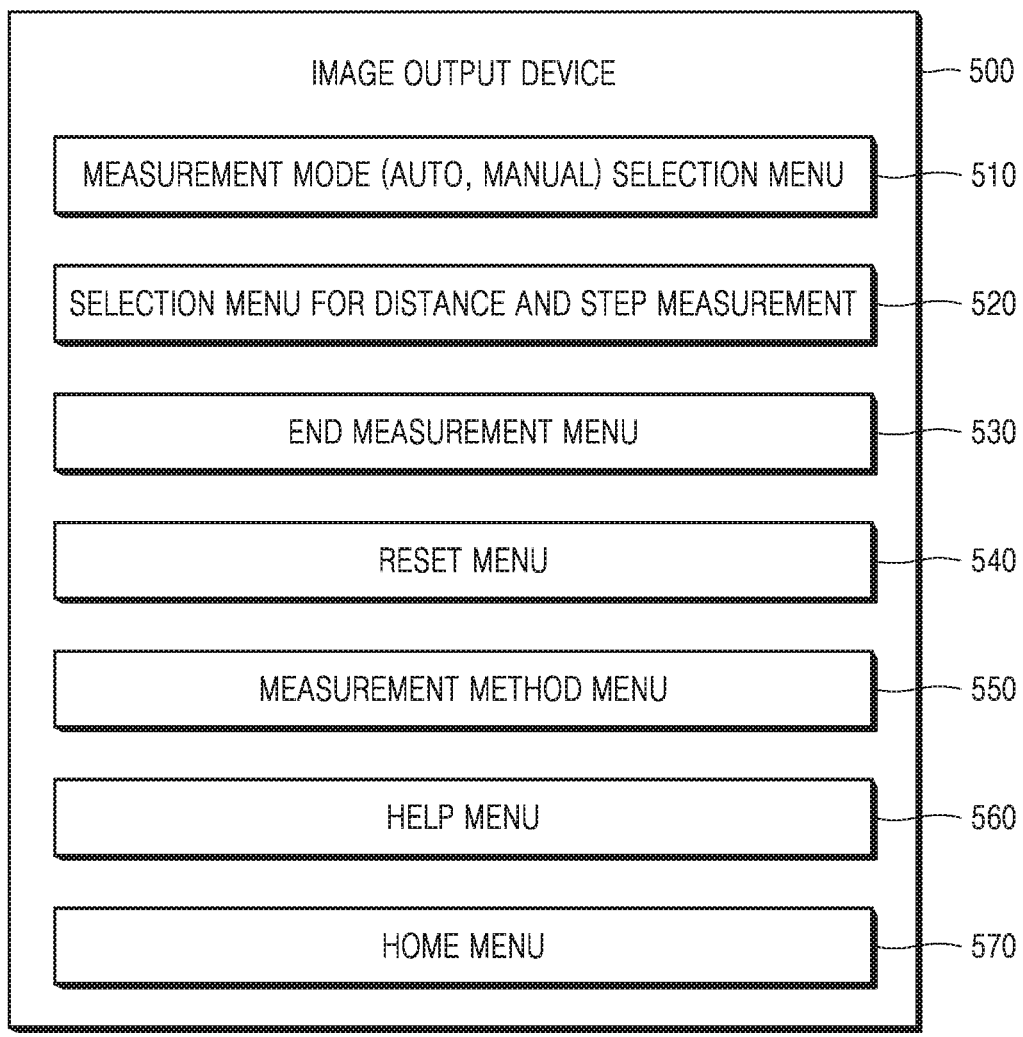

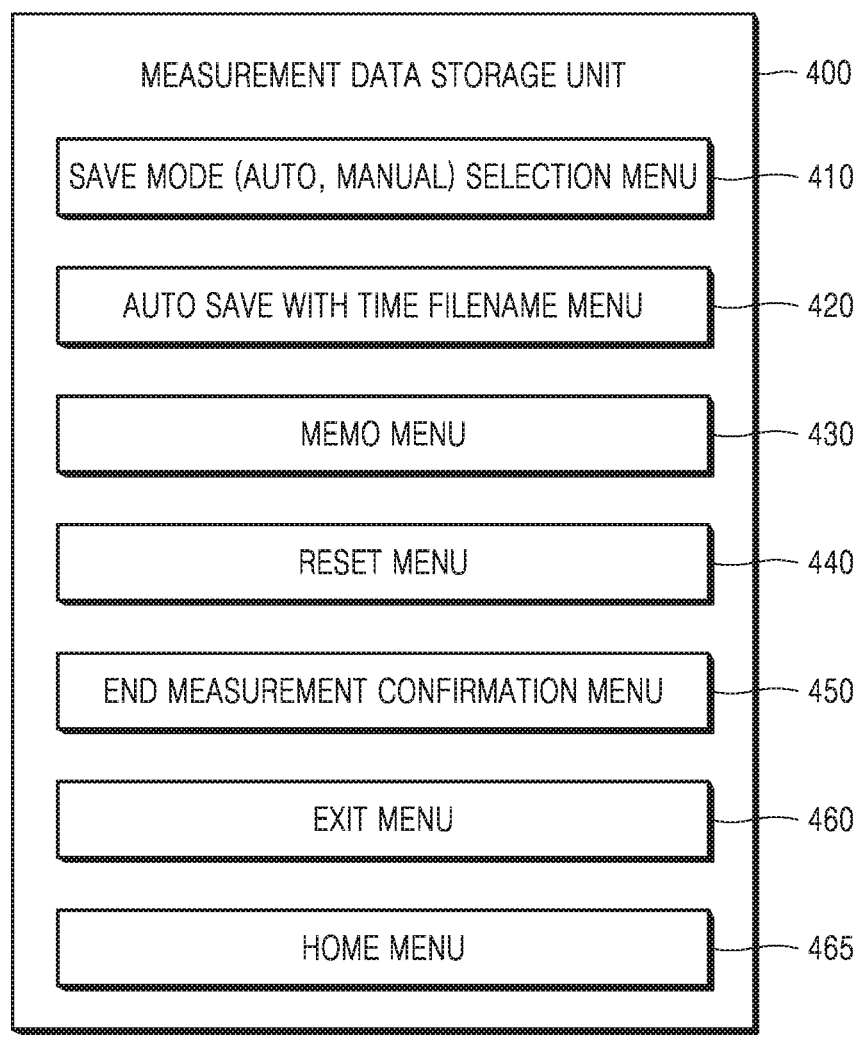
[FIG. 8]

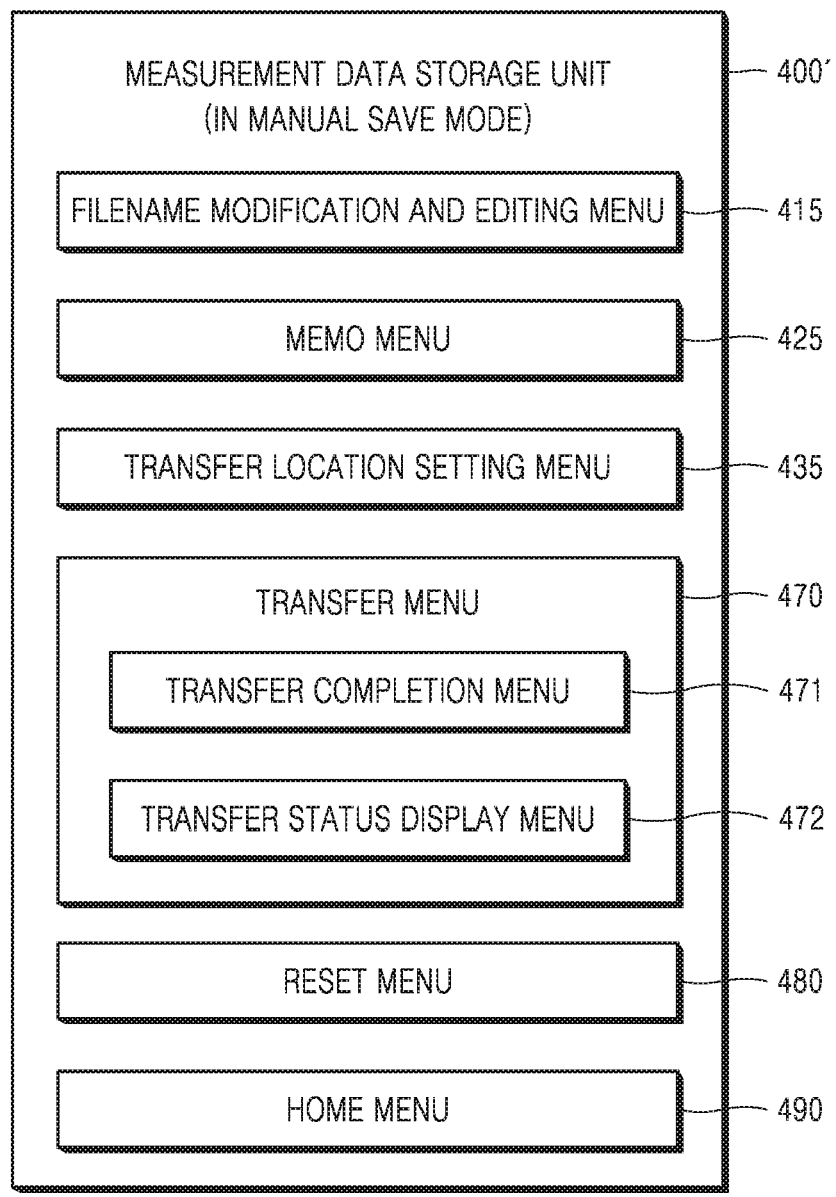
[FIG. 9]

METHOD AND APPARATUS FOR QUALITY ASSURANCE OF AUTOMOBILE COMPONENT USING MARKER

CROSS-REFERENCE TO RELATED APPLICATION(S)

This application is a National Phase Patent Application of International Patent Application Number PCT/KR2018/016082, filed on Dec. 18, 2018, which claims priority of Korean Patent Application No. 10-2017-0174258, filed Dec. 18, 2017, the entire contents of both of which are incorporated herein by reference.

TECHNICAL FIELD

The present disclosure relates to a method and an apparatus for assuring quality of a component, and more particularly, to a method and an apparatus for quality assurance of an automobile component using a marker, that can remove human error and apply a user-oriented display method, by utilizing image analysis techniques, such as a compensation technique according to shooting distance of a high-resolution camera of a terminal having a shooting function, a reference measurement technique where a marker itself includes information such as spatial information and measurement specifications and the like, and distortion correction of a taken image.

BACKGROUND ART

In general, automobiles are made up of a large number of components, and management of these components requires a lot of personnel and facilities.

In other words, in order to make one vehicle, more than 20,000 components must be assembled, and if any of them are missing, serious accidents can occur.

It is easy to tell whether a part is missing if it is bulky, but it is difficult to detect the omission of very small components such as nuts.

Thus, it is very important for automobile manufacturing companies to efficiently manage such automobile components.

Therefore, about the automobile components, all employees of automobile manufacturing companies should be aware of the logistics system through which the automobile components are obtained and the route through which the line-up is being made.

The reason is that efficient management of automobile components affects productivity, and ultimately affects manufacturing costs.

In particular, the quality information of automobile components must be shared by all relevant employees.

The reason is that the quality of the components directly affects the quality of the product.

However, currently, it is known that only the person in charge of the quality information on automobile components is aware.

The reason is that the quality information for automobile components is not in a database (DB).

A quality information system is what was introduced to overcome such a conventional problem.

This is a field management technique that enables the generation of a product of satisfactory quality with high productivity via analysis/statistical data based on accumulated data.

In conventional quality information systems for automotive electrical equipment, suppliers, that is, electrical equipment manufacturers, performance inspection centers of automobile companies, assembly plants, repair shops and the like conduct tests on their own.

In addition, quality improvement was supported by utilizing the resulting data as analysis/statistical data, to self-evaluate the product quality, and then reviewing key quality issues and finding quality abnormalities.

However, in the conventional quality information system of automotive electrical equipment, only the results of each self-conducted test by customers, suppliers, automobile manufacturers' performance inspection centers, assembly plants, maintenance shops and the like for automobile electrical equipment are utilized as analysis/statistical data.

Therefore, there is a problem that it is not possible to provide and share quality information promptly, so it takes a lot of time to review and improve the main quality issues.

In addition, it is difficult to find quality abnormalities for electrical components early, and thus there is a disadvantage that reliability and transparency of components cannot be obtained.

On the other hand, the components used in the manufacture of a vehicle are subjected to an operation inspection and durability inspection before shipment.

That is, each component constituting the automobile is coupled using a press or a bolt, etc., and the distance between reference points is measured by a worker in a state where the vehicle parts are placed on top of a fixed jig to check whether the automobile components are defective.

However, according to the conventional method, not only the inspection of the automobile components was performed manually, but also various kinds of information by the inspection were recorded manually.

Accordingly, not only the accuracy of the measurement is reduced due to the work performed by the subjective judgment of the worker, but it is difficult to standardize the quality information of the inspected components due to the difficulty in storing and documenting the inspection results.

That is, the instrument for measuring the current length is classified into three types: a vernier caliper method or an optical method using a projector, an optical microscope or the like, a pin movement contact type measuring device, and a three-dimensional measuring device.

However, there is a limit in that the vernier caliper method is easy to use at a low cost but cannot obtain precise data, and the optical method can measure only those having a length above 100 m/m.

In addition, the pin movement contact type measuring device measures the distance between the pins by contacting the pins with grooves or holes, etc., and although the location of grooves and holes of a regular dimension can be measured, it is difficult to measure other shapes (for example, curved parts) and although the three-dimensional measuring device has multi-functionality, it is too expensive to obtain.

For example, when the diameter of a component to be measured is measured using a vernier caliper in the related art, physical contact is required, so a relatively large measurement error is inevitable, and when measuring a part with a small diameter, there is a problem in that the possibility of the wave diameter changing increases due to the physical contact force.

In addition, there is a microscope-type non-contact type measuring device, but there is a problem that it is too expensive to be used for automobile components inspection.

Further, there were problems in that the quality inspection took a lot of time, and frequent accidents occurred with the workers due to the size and weight of automobile components.

Further, due to the manual inspection as in the prior art, there was also a problem in that the reliability of the components deteriorated because it is difficult to continuously produce standard components.

In order to overcome such problems of manual inspection, recently, a mechanical quality inspection system has been introduced to inspect whether components are defective using a proximity sensor in the final process of components production.

However, although the defect rate was reduced due to the introduction of such an inspection device using a proximity sensor, it was limited in that it was impossible to inspect all the accessories of the gusset using this.

In order to improve the shortcomings of such an inspection device using a proximity sensor, conventionally, there was an inspection device using a vision system in which the inspection area of the gusset was divided using two cameras, a first camera inspecting a nut and a support bracket and a second camera inspecting a floating nut, plate, and support bracket.

However, even in this case, there is a problem in that the camera installed in the work line causes inconvenience to work and reduces work efficiency.

Further, when the automobile components to be inspected are directly exposed to the external environment, there is a problem that the image of the automobile components taken by the camera is non-uniform due to welding sparks generated at the work site or changes in lighting caused by the movement of workers.

As another method of a non-contact mechanical quality inspection system, there is a method capable of measuring the width (diameter) of a component using a laser.

That is, when measuring the width of an object, it is most accurate to directly measure the width of the object using a measuring instrument.

However, there is a need for a method for indirectly measuring the width (diameter) of an object when measuring a large amount of objects or when a measuring instrument cannot be used.

As an existing method for measuring width, measurements were made by a contact type method using a measuring instrument such as a ruler or a vernier caliper.

However, in the case where it is necessary to measure the width (diameter) of an object under environmental conditions where such a measuring instrument is cannot be brought directly into contact with the object (for example, when measurement is inconvenient or impossible due to the physical dimensions and shape of the vernier calipers inside and outside the vehicle), a method is required that can measure the width (diameter) of the object in a non-contact manner.

Further, a contact type measuring device such as the conventional ruler or vernier caliper has a portable inconvenience in that a worker must carry it at all times, and there were difficulties in directly recording the measured data and storing the recorded data.

Accordingly, there is a measurement method using a laser to measure the width of an object more accurately and quickly and in a non-contact manner, and a measurement method using an application of a mobile terminal such as a smartphone or a smart pad.

However, the measurement method using a laser has a disadvantage in that it is difficult to obtain the component parts such as a laser scanner, a laser point, and a CCD camera and the like because the price thereof are too high.

In addition, the measurement method using the application of the mobile terminal utilizes the data of the database in which information about the base length or dimension of a reference is pre-stored uniformly, as reference information is used with a camera equipped with a sensor to measure in a non-contact manner.

Accordingly, there is a limitation in that the accuracy of measurement is deteriorated because it cannot flexibly address various sizes or locations or such of the taken image.

In addition, conventionally, components inspection equipment using a vision system is used for semiconductor wafer inspection, PCB substrate search or pharmaceutical inspection and the like.

However, these components inspection equipment is expensive, and the algorithm is limited to a specific industry, so it has been difficult for automobile related companies to introduce it.

Moreover, there are more than 20,000 components, and the process is also diverse, so in the case of automotive components that require a new algorithm for each component, it was even more difficult.

Accordingly, the present inventor was led to invent an apparatus for quality assurance of automobile components using a marker which: acquires an image of the fully assembled component by using a reference measurement technique including information such as spatial information and measurement specifications on the high-resolution camera and the marker itself of a terminal having a shooting function; eliminates the inconvenience of portability and the inconvenience of recording and storage of measured data of the conventional contact type measuring instrument; and improves measurement accuracy by variously and flexibly correcting a taken image into a basic image via size conversion, parallel movement, and rotational movement, such that it can replace the import of contact type precision measuring instruments.

In addition, was led to invent a method for quality assurance of automobile components using a marker, wherein since the quality information on components can be made into a database (DB); it is possible to share information between involved persons of component manufacturing companies and suppliers; it is easy to detect abnormalities in quality for components early on; and by utilizing a terminal having a generalized shooting function, it is possible to conduct ubiquitous measurements that can be measured anytime, anywhere using a terminal.

DETAILED DESCRIPTION OF THE INVENTION

Technical Problem

The object of the present disclosure is directed to provide a method for quality assurance of an automobile component using a marker, that can remove human error and apply a user-oriented display method, by utilizing image analysis techniques, such as a compensation technique according to shooting distance for a high-resolution camera of a terminal having a shooting function, a reference measurement technique where a marker itself includes information such as spatial information and measurement specifications and the like, and distortion correction of a taken image.

Another object of the present disclosure is directed to provide an apparatus for quality assurance of an automobile component using a marker for achieving the above object.

Technical Solution

To achieve the above object, according to the present disclosure, there is provided a method for quality assurance of an automobile component using a marker, comprising: (a) shooting a fully assembled component to which a marker having a predetermined shape is pre-attached, via an image taking unit driven according to an operation of a terminal having a shooting function; (b) receiving the taken image and using an image processing function to specify the dimensions of the fully assembled component according to the difference in size and shape between the marker and the fully assembled component, and then using the marker to correct and output as a basic image, via an image pre-processing unit; (c) receiving the corrected basic image and performing a measurement site metrology algorithm to measure a distance and a step of the component, via a distance and step measurement unit; (d) receiving and storing measurement data on the measured distance and step, via a measurement data storage unit; and (e) receiving and displaying the corrected basic image and the measurement data, via an image output device, wherein the measurement site metrology algorithm uses an intersection point of a vertical line, base point of which is a measurement reference point for a measurement site of the component, and a relative reference point in the corrected basic image, to calculate an absolute length of the vertical line relative to an absolute length of the marker to measure the distance and step of the component.

To achieve the above object, according to the present disclosure, there is provided a method for quality assurance of an automobile component using a marker, comprising: (a) shooting a fully assembled component to which a marker having a predetermined shape is pre-attached, via an image taking unit driven according to an operation of a terminal having a shooting function; (b) receiving the taken image and using an image processing function to specify the dimensions of the fully assembled component according to the difference in size and shape between the marker and the fully assembled component, and then using the marker to correct and output as a basic image, via an image pre-processing unit; and (c) receiving the corrected basic image and selecting a measurement mode, and performing a measurement site metrology algorithm to measure a distance and a step of the component, via a distance and step measurement unit; wherein when the selected measurement mode is a manual measurement mode, a measurement site is enlarged and displayed, and the measurement site and interval are adjusted using a measurement site editing cursor and an interval display bar.

To achieve the above object, according to the present disclosure, in the method for quality assurance of an automobile component using a marker, the (b) step is characterized in that, an inverse affine transformation is performed on the taken image to be corrected into the basic image via size transformation, parallel movement, and rotational movement.

To achieve the above object, according to the present disclosure, there is provided a method for quality assurance of an automobile component using a marker, comprising: (a) shooting a fully assembled component to which a marker having a predetermined shape driven by an operation of a terminal having a shooting function by an image taking unit; (b) receiving the taken image and using an image processing function to specify the dimensions of the fully assembled component according to the difference in size and shape between the marker and the fully assembled component, and then using the marker to correct and output as a basic image, via an image pre-processing unit; and (c) receiving the corrected basic image and performing a measurement site metrology algorithm to measure a distance and a step of the component, via a distance and step measurement unit; wherein the measurement site metrology algorithm comprises, detecting an edge of a measurement site of the component from the corrected basic image; estimating a vertical line, a base point of which is a measurement reference point set based on the detected edge; detecting an intersection point of the estimated vertical line and a relative reference point of the component; measuring the length of the vertical line, and calculating an absolute length of the vertical line relative to an absolute length of the marker; and measuring a distance and a step of the component based on the calculated absolute length of the vertical line.

To achieve another said object, according to the present disclosure, there is provided an apparatus for quality assurance of an automobile component using a marker, comprising: an image taking unit that is driven according to an operation of a terminal having a shooting function and shoots a fully assembled component to which a reference template including a marker of a predetermined shape is pre-attached; an image pre-processing unit that receives the taken image and uses an image processing function to specify the dimensions of the fully assembled component according to the difference in size and shape between the marker and the fully assembled component and then uses the marker to correct and output as a basic image; and a distance and step measurement unit that receives the corrected basic image and performs a measurement site metrology algorithm to measure a distance and a step of the component; wherein in the marker, information about measurement specifications according to the measurement purpose of a measured object is encoded and stored, and an absolute dimension of a measurement site of the component is obtained through dimension analysis provided for a two-dimensional accumulation measurement.

To achieve another said object, according to the present disclosure, in the apparatus for quality assurance of an automobile component using a marker, the marker is characterized in that it stores spatial information on variables necessary for correcting the taken image.

To achieve another said object, according to the present disclosure, in the apparatus for quality assurance of an automobile component using a marker, the image pre-processing unit is characterized in that it performs an inverse affine transformation on the taken image to correct into the basic image via size transformation, parallel movement, and rotational movement.

To achieve another said object, according to the present disclosure, there is provided an apparatus for quality assurance of an automobile component using a marker, comprising: an image taking unit that is driven according to an operation of a terminal having a shooting function and shoots a fully assembled component to which a reference template including a marker of a predetermined shape is pre-attached; an image pre-processing unit that receives the taken image and uses an image processing function to specify the dimensions of the fully assembled component according to the difference in size and shape between the marker and the fully assembled component and then uses the marker to correct and output as a basic image; a distance and step measurement unit that receives the corrected basic image and performs a measurement site metrology algorithm to measure a distance and a step of the component; a measurement data storage unit that receives and stores measurement data on the measured distance and step; and an image output device that receives and displays the corrected basic image and the measurement data; wherein the marker is of a matte metal or synthetic resin material.

To achieve another said object, according to the present disclosure, in the apparatus for quality assurance of an automobile component using a marker, the marker is characterized in that it stores the spatial information on variables necessary for correcting the taken image.

To achieve another said object, according to the present disclosure, in the apparatus for quality assurance of an automobile component using a marker, the image pre-processing unit is characterized in that it performs an inverse affine transformation on the taken image to correct into the basic image via size transformation, parallel movement, and rotational movement.

To achieve another said object, according to the present disclosure, in the apparatus for quality assurance of an automobile component using a marker, the reference template is characterized in that it is of a transparent silicon plate material.

The specific details of the other embodiments are included in the "specific contents for carrying out the disclosure" and the attached "drawings".

The advantages and features of the present invention and methods of achieving them will be apparent from the following exemplary embodiments that will be described in more detail with reference to the accompanying drawings.

However, the present disclosure is not limited to the embodiments disclosed below and may be realized in various other forms. The present embodiments make the disclosure complete and are provided to completely inform one of ordinary skill in the art to which the present disclosure pertains, of the scope of the disclosure. The present disclosure is defined only by the scope of the claims.

Advantageous Effects

According to the present disclosure, since an image of a fully assembled component is acquired by using a high-resolution camera and a reference measurement technique of a terminal having a shooting function, it is convenient to measure distances and steps of the component, and it is possible to improve measurement accuracy by variously and flexibly correcting a taken image into a basic image via size conversion, parallel movement, and rotational movement through inverse affine transformation.

In addition, the inconvenience of portability of a conventional contact type measuring instrument is eliminated, and the marker itself can include information such as spatial information and measurement specifications, and by developing a customized reference template, it is possible to replace the import of contact type precision measuring instruments that rely on imports.

In addition, since the quality information on components can be made into a database (DB) and it is possible to share information between involved persons of component manufacturing companies and suppliers, the time and effort required to review and improve the quality analysis of major components is reduced, thereby improving efficiency of components quality management.

In addition, since it is easy to detect abnormalities in quality for components early on and it is possible to form a reliability and transparency for the components, product reliability and productivity are improved.

In addition, since it is possible to utilize a terminal with a generalized shooting function, when compared to a non-contact mechanical quality inspection system such as an optical method using a projector or an optical microscope, an inspection device using a proximity sensor, and a measuring device using a laser and the like, there is no need to purchase expensive components inspection equipment, and ubiquitous measurement can be performed anytime, anywhere.

BRIEF DESCRIPTION OF THE DRAWINGS

FIG. 1 is a block diagram of an apparatus for quality assurance of an automobile component using a marker according to the present disclosure.

FIG. 2 is a flowchart for describing an operation of the method for quality assurance of an automobile component using a marker according to the present disclosure.

FIG. 3 is a plan view of an embodiment of a reference template T including a marker M used in step S100 of the method for quality assurance of an automobile component illustrated in FIG. 2.

FIG. 4 is a photograph of an image taken of an article to which the reference template T including the marker M used in step S100 is attached, according to an embodiment of the method for quality assurance of an automobile component illustrated in FIG. 2.

FIG. 5 is a photograph of a taken image received by an image pre-processing unit and a basic image corrected by image processing in step S300 according to another embodiment of the method for quality assurance of an automobile component illustrated in FIG. 2.

FIG. 6 is a flow chart for describing the operation of the method for quality assurance of an automobile component using a marker according to the present disclosure.

FIG. 7 is a configuration diagram of screen components displayed on the image output device 500 in the apparatus for quality assurance of an automobile component illustrated in FIG. 1.

FIG. 8 is a configuration diagram of screen components displayed on the image output device 500 when the measurement data is stored in the measurement data storage unit 400 in the apparatus for quality assurance of an automobile component illustrated in FIG. 1.

FIG. 9 is a configuration diagram of screen components displayed on the image output device 500 when the measurement data is stored in a manual storage mode in the measurement data storage unit 400' in the apparatus for quality assurance of an automobile component illustrated in FIG. 1.

DETAILED DESCRIPTION OF THE EMBODIMENTS

Hereinafter, preferred embodiments of the present disclosure will be described in detail with reference to the accompanying drawings.

Prior to a detailed description of the present disclosure, it should be understood that the terms and wordings used herein should not be construed to be limited to general or lexical means and the concepts of the terms may be defined to describe the invention made by the inventor(s) of the present disclosure in the best way.

Moreover, the terms and wordings should be constructed to have meanings and concepts that agree with the technical spirit of the present disclosure.

That is, it should be understood that the terms used herein are used only to describe preferred embodiments of the present disclosure, but are not used to limit the contents of the present disclosure.

These terms are defined in consideration of various possibilities of the present disclosure.

Further, in the specification, a similar expression may include a plural expression unless the context is indicated clearly.

Further, it should be appreciated that a plural expression may include a singular form similarly.

Throughout the specification, when it is described that an element "includes" another element, it may mean that any other element may further include any other element without excluding the other element unless a particularly contradictory description is made.

Moreover, when it is described that any element is "present within or connected with" another element, the first element may be directly connected with the second element to contact the second element and may be spaced apart from each other.

Further, when they may be spaced apart from each other by a specific distance and they are spaced apart from each other by a specific distance, a third element or unit for fixing or connecting the first element with the second element may be present.

Meanwhile, it should be understood that a description of the third element or unit may be omitted.

Meanwhile, when it is described that any element is "directly connected with" another element, it should be understood that a third element or unit is not present.

Similarly, it should be construed that other expressions that describe the relationships between elements, such as "between", "directly between", "adjacent to", and "directly adjacent to" may have the same purpose.

Further, it should be understood that in the specification, if terms, such as "one surface", "an opposite surface", "one side", "an opposite side", "first", and "second" are used, they are used to clearly distinguish one element from the other elements.

However, it should be understood that the meaning of the corresponding element is not restricted by these terms.

Further, it should be understood that in the specification, if the terms, such as "upper", "lower", "left", and "right", which relates to locations, are used, they indicate a relative location in the drawing.

Further, in regard to the positions, it should not be construed to mention an absolute location unless an absolute location is not particularly specified.

Moreover, in the specification of the present disclosure, if the terms such as "unit", "-er (-or)", "module", and "device" is used, they mean a unit for processing at least one function or operation.

It should be understood that they may be implemented through hardware, software, or a combination of hardware and software.

In the accompanying drawings, the sizes, locations, coupling relationships of the elements may be partially exaggerated or reduced, or omitted to clearly deliver the spirit of the present disclosure or for convenience of description, and accordingly, the proportion or scale may not be strict.

Further, in the following description of the present invention, a detailed description of configurations that may make the essence of the present disclosure unnecessarily obscure, for example, known technology including the conventional technology may be omitted.

FIG. 1 is a block diagram of an apparatus for quality assurance of an automobile component using a marker according to the present disclosure, wherein an image taking unit 100, an image pre-processing unit 200, a distance and step measurement unit 300, a measurement data storage unit 400 and an image output device 500 are provided.

The image pre-processing unit 200 includes marker information use 210, and the distance and step measurement unit 300 includes a measurement site metrology algorithm 310.

Referring to FIG. 1, the configuration and function of an apparatus for quality assurance of an automobile component using a marker according to a first embodiment of the present disclosure are as follows.

The image taking unit 100 is driven according to an operation of a terminal having a shooting function to shoot a fully assembled component.

The image pre-processing unit 200 receives a taken image from the image taking unit 100 and uses an image processing function to specify the dimensions of the fully assembled component according to the difference in size and shape between the marker and the fully assembled component, and then uses the marker to correct and output as a basic image.

At this time, the material of the marker is a matte metal or synthetic resin, and an absolute dimension of a measurement site of a component is obtained through a dimension analysis provided for two-dimensional accumulation measurement.

The distance and step measurement unit 300 receives the corrected basic image from the image pre-processing unit 200 and performs a measurement site metrology algorithm 310 to measure the distance and step of the component.

At this time, the measurement site metrology algorithm 310 uses an intersection point of a vertical line, base point of which is a measurement reference point for a measurement site of the component, and a relative reference point in the corrected basic image, to calculate an absolute length of the vertical line relative to an absolute length, according to the marker information use 210, to measure the distance and step of the component.

The measurement data storage unit 400 receives and stores measurement data on the measured distance and step from the distance and step measurement unit 300.

The image output device 500 is a screen or a desktop monitor of a portable terminal, and receives the corrected basic image from the image pre-processing unit 200 and receives and displays measurement data from the measurement data storage unit 400.

FIG. 2 is a flowchart for describing an operation of the method for quality assurance of an automobile component using a marker according to a second embodiment of the present disclosure.

A schematic operation of a method for quality assurance of an automobile component using a marker according to the second embodiment of the present disclosure will be described with reference to FIGS. 1 and 2 as follows.

The image taking unit 100 is driven according to an operation of a terminal having a shooting function to shoot a fully assembled component in step S100.

The image pre-processing unit 200 receives a taken image from the image taking unit 100 and uses an image processing function to specify the dimension of the fully assembled component according to the difference in size and shape between the marker and the fully assembled component in step S200, and then uses the marker to correct and output as a basic image in step S300.

The distance and step measurement unit 300 receives the corrected basic image from the image pre-processing unit 200 and the measurement mode is selected to perform a measurement site metrology algorithm 310 to measure a distance and a step of the component in step S400.

At this time, when the selected measurement mode is a manual measurement mode, the measurement site is enlarged and displayed, and the measurement site and interval are adjusted using a measurement site editing cursor and an interval display bar.

The measurement data storage unit 400 receives and stores measurement data on the measured distance and step from the distance and step measurement unit 300 in step S500.

The image output device 500 receives the corrected basic image from the image pre-processing unit 200 and receives and displays measurement data from the measurement data storage unit 400 in step S600.

Detailed operation description of the method for quality assurance of an automobile component using a marker according to the second embodiment of the present disclosure will be described later.

FIG. 3 is a plan view of an embodiment of a reference template T including a marker M used in step S100 of the method for quality assurance of an automobile component shown in FIG. 2.

FIG. 4 is a photograph of an image taken of an article to which the reference template T including the marker M used in step S100 is attached, according to an embodiment of the method for quality assurance of an automobile component illustrated in FIG. 2.

FIG. 5 is a photograph of a taken image received by an image pre-processing unit and a basic image corrected by image processing in step S300 according to another embodiment of the method for quality assurance of an automobile component illustrated in FIG. 2.

FIG. 6 is a flow chart for describing a partial operation of step S400 of the method for quality assurance of an automobile component illustrated in FIG. 2.

A schematic operation of the measuring distance and step in step S400 of the method for quality assurance of an automobile component using a marker according to the second embodiment of the present disclosure will be described with reference to FIGS. 1 to 6 as follows.

In the image pre-processing unit 200, an edge of a measurement site of a component is detected from a corrected basic image in step S410.

A vertical line, a base point of which is a measurement reference point set based on the detected edge, is estimated in step S420.

An intersection point of the estimated vertical line and the relative reference point of the component is detected in step S430.

By measuring the length of the vertical line in step S440, an absolute length of the vertical line relative to an absolute length is calculated according to marker information use 210 in step S450.

The distance and the step of the component are measured based on the calculated absolute length of the vertical line in step S460 and transferred to the measurement data storage unit 400 and the image output device 500 in step S470.

A detailed operation of the method for quality assurance of an automobile component using a marker according to the second embodiment of the present disclosure will be described with reference to FIGS. 1 to 6 as follows.

As shown in FIG. 3, the reference template T used in step S100 of the method for quality assurance of an automobile component of the present disclosure is a transparent silicon plate material, and includes a marker M which is a coding region visualized at each corner with a predetermined shape having a predetermined length.

In the marker M, specific items such as specific variables for measurement specifications according to the measurement purpose of the object to be measured are encoded and stored.

In the present embodiment, for convenience of understanding, the predetermined length is set to 50 mm, and the predetermined shape is set to a square, but it can be variously set according to the industrial field of the measured object.

In addition, the spatial information such as the length and size of the marker M is a variable necessary for the correction of the taken image, and by using a basic image corrected using the same, the length, size, area, angle, and the like of the object to be measured are measured with a predetermined measurement algorithm.

As shown in FIG. 5, the method for quality assurance of an automobile component according to the present disclosure uses the following equation of the inverse affine transformation technique to variously and flexibly correct the taken image to the basic image via size transformation, parallel movement, and rotational movement of the taken image.

$$F\begin{pmatrix} x \\ y \end{pmatrix} = \begin{pmatrix} a & 0 \\ 0 & d \end{pmatrix}\begin{pmatrix} x \\ y \end{pmatrix} \quad \text{[Equation 1]}$$

Here, a and d are parameters indicating horizontal and vertical multiples of the taken image, respectively.

$$F\begin{pmatrix} x \\ y \end{pmatrix} = \begin{pmatrix} 1 & 0 \\ 0 & 1 \end{pmatrix}\begin{pmatrix} x \\ y \end{pmatrix} + \begin{pmatrix} t_1 \\ t_2 \end{pmatrix} \quad \text{[Equation 2]}$$

Here, t1 and t2 are parameters indicating the time of parallel movement of the taken image in the horizontal axis direction and the vertical axis direction, respectively.

$$F\begin{pmatrix} x \\ y \end{pmatrix} = \begin{pmatrix} \cos\theta & -\sin\theta \\ \sin\theta & \cos\theta \end{pmatrix}\begin{pmatrix} x \\ y \end{pmatrix} \quad \text{[Equation 3]}$$

Here, θ is a parameter indicating an angle of rotating the taken image.

That is, by using Equation 1 for the size conversion of the taken image, Equation 2 for parallel movement, and Equation 3 for rotational movement, variously and flexibly correcting the basic image, thereby improving measurement accuracy.

As described above, the present disclosure is unlike a measurement method using a conventional portable terminal application that uses information about a known length or dimension uniformly stored in a database as a reference through information stored in the marker M itself, in that according to the industrial field of the object to be measured, various reference templates T customized for electricity, electronics, machinery, heavy industry, agricultural and fisheries industry, etc. are produced to flexibly cope with various sizes and locations of taken images.

FIG. 7 is a configuration diagram of screen components displayed on the image output device 500 in the apparatus for quality assurance of an automobile component shown in FIG. 1, wherein a measurement mode (auto, manual) selection menu 510, a selection menu for distance and step measurement 520, an end measurement menu 530, a reset menu 540, a measurement method menu 550, a help menu 560, and a home menu 570 are included.

FIG. 8 is a configuration diagram of screen components displayed on the image output device 500 when the measurement data is stored in the measurement data storage unit 400 in the apparatus for quality assurance of an automobile component illustrated in FIG. 1, wherein a save mode (auto, manual) selection menu 410, an auto save with time filename menu 420, a memo menu 430, a reset menu 440, an end measurement confirmation menu 450, an exit menu 460, and a home menu 465 are included.

FIG. 9 is a configuration diagram of screen components displayed on the image output device 500 when the measurement data is stored in a manual storage mode in the measurement data storage unit 400' in the apparatus for quality assurance of an automobile component illustrated in FIG. 1, wherein a filename modification and editing menu 415, a memo menu 425, a transfer location setting menu 435, a transfer menu 470, a transfer completion menu 471, a transfer status display menu 472, a reset menu 480 and a home menu 490 are included.

The operation of the method for quality assurance of an automobile component using a marker according to the first embodiment of the present disclosure will be described in detail with reference to FIGS. 1 to 9.

First, the image taking unit 100 is driven according to a user's operation of a terminal having a shooting function to shoot a fully assembled component.

The image pre-processing unit 200 receives the taken image from the image taking unit 100 and uses the image processing function to identify the dimension of the fully assembled component according to the difference in size and shape between the marker M and the fully assembled component, and then uses the marker M to correct into a basic image and then saves it.

That is, an object to be measured or an area to be measured is enlarged or reduced on a screen for obtaining a high-precision measurement value, and if necessary, the level of the measurement site is maintained by three-axis rotation.

In addition, an absolute dimension of a measurement target site is acquired through dimension analysis according to the marker information use 210 provided for a two-dimensional accumulation measurement.

For example, the absolute dimension of the measurement target site is specified using the difference of the size and shape between the marker and the measurement target site.

According to the industrial field of the object to be measured, various reference templates T customized for electricity, electronics, machinery, heavy industry, agricultural and fisheries industry, etc. are produced to flexibly address various sizes and locations of taken images.

At this time, the marker M is divided into a disposable and permanent type, and is configured in the form of geometric shapes such as a right triangle, a cuboid, a cube, and a coin-shape.

In addition, it is formed from a matte metal or synthetic resin such as tungsten or lead in a protruding form or sheet form and is then molded.

For example, when the marker M is a protruding form, a measurement position of a vehicle component can be specified through a positional relationship with a measurement target site, and measurement of size and shape is accurately performed.

The reason why the material of the marker M is made of a matte metal or a synthetic resin is that in order to clearly capture an image of a measurement target site, required is a material through which radiation is difficult to transmit and does not easily contract or expand thermally due to temperature changes.

The image output device 500 receives the corrected basic image from the image pre-processing unit 200 and displays it on a screen or desktop monitor of a portable terminal.

Screen components of the image output device 500 include a measurement mode (auto, manual) selection menu 510, a selection menu for distance and step measurement 520, an end measurement menu 530, a reset menu 540, a measurement method menu 550 and a help menu 560.

At this time, each menu may be displayed as an icon on the screen of the image output device 500 for a graphic user interface.

In addition, when the auto measurement mode is selected in the measurement mode (auto, manual) selection menu 510, the measurable site is automatically selected from the image and measured, and the measurement site and the measured value are displayed on the screen.

If the manual measurement mode is selected in the measurement mode (auto, manual) selection menu 510, the measurement site can be enlarged and displayed, and the measurement site and interval are adjusted using the measurement site editing cursor and the interval display bar.

The auto measurement mode and the manual measurement mode commonly include a reset menu 540 that can be initialized for re-measurement and a home menu 570 that switches to a home page.

The distance and step measurement unit 300 receives the corrected basic image from the image pre-processing unit 200 and performs the following measurement site metrology algorithm 310 for the distance and step of the component.

That is, the edge of the measurement site of the component is detected, and a measurement reference point is set based on the detected edge to estimate a vertical line having this as a base point.

In addition, the intersection point of the estimated vertical line and the relative reference point of the component is detected, the length (distance) of the vertical line is measured, and the absolute length of the vertical line is calculated using the absolute length of the marker M.

If the auto measurement mode is selected in the measurement mode (auto, manual) selection menu, the measurement site metrology algorithm 310 is executed using the accumulated measurement value by the marker M.

On the other hand, when the manual measurement mode is selected from the measurement mode (auto, manual) selection menu, the measurement site can be enlarged and displayed, and the measurement site and interval are adjusted using the measurement site editing cursor and the interval display bar.

In addition, in the manual measurement mode, the measurement site metrology algorithm 310 is executed with reference to the measurement display bar.

The measurement data storage unit 400 receives the distance and step measurement data measured from the distance and step measurement unit 300 and saves it with a filename of time.

Screen components of the measurement data storage unit 400 include a save mode (auto, manual) selection menu 410, a auto save with time filename menu 420, a memo menu 430, a reset menu 440, an end measurement menu 450, an exit menu 460, and a home menu 465.

At this time, each menu may be displayed as an icon on the screen of the image output device 500 for a graphic user interface.

The auto save mode is the default, but if the manual save mode is selected in the save mode (auto, manual) selection menu 410, the filename modification and editing menu 415, the memo menu 425, the transfer location setting menu 435, the transfer menu 470, the reset menu 480 and a the home menu 490 are included, and the transfer menu 470 includes a transfer completion menu 471 and a transfer status display menu 472.

The auto measurement mode and the manual measurement mode commonly include a reset menu that can reset for re-measurement.

Meanwhile, the method for quality assurance of an automobile component using a marker according to the first embodiment of the present disclosure described above may be implemented in the form of program instructions that can be performed through various computer means and may be recorded in a computer-readable medium.

The computer-readable medium may include program instructions, data files, data structures, or the like alone or in combination.

The program instructions recorded on the medium may be specially designed and configured for the present invention, or may be known and usable by those skilled in computer software.

Examples of computer-readable recording media include magnetic media such as hard disks, floppy disks, and magnetic tapes, and optical media such as CD-ROMs and DVDs.

Also, hardware devices specifically configured to store and execute program instructions such as magneto-optical media such as floptical disks, and ROM, RAM, flash memory, HDD (Hard Disk Drive), Micro SD Card, USB Memory, etc. are included.

Examples of program instructions include not only machine language codes produced by a compiler, but also high-level language codes that can be executed by a computer using an interpreter or the like.

The hardware device described above may be configured to operate as one or more software modules to perform the operation of the present invention, and vice versa.

That is, the program according to the present invention is a computer program related to a method for quality assurance of an automobile component using a marker, including: shooting a fully assembled component via an image taking unit 100 driven according to an operation of a terminal having a shooting function; and receiving the taken image and using an image processing function to specify the dimensions of the fully assembled components according to the difference in size and shape between the marker M and the fully assembled component, and then using the marker M to correct and output as a basic image, via an image pre-processing unit 200.

In addition, the computer program is characterized in that it includes, receiving the corrected basic image and performs a measurement site metrology algorithm 310 for the distance and step of the component, via the distance and step measurement unit 300; receiving and storing the measured distance and step measurement data via the measurement data storage unit 400; and receiving and displaying the corrected basic image and the measured distance and step measurement data via the image output device 500.

The measurement site metrology algorithm 310 of the computer program includes detecting an edge of the measurement site of the component from the corrected basic image; estimating a vertical line, base point of which is a measurement reference point set based on the detected edge; detecting an intersection point of the estimated vertical line and a relative reference point of the component; and measuring the length of the vertical line to calculate the absolute length of the vertical line relative to the absolute length of the marker M.

The computer program of the present disclosure is a computer program that can be provided via a storage medium, a communication medium, for example, a recording medium such as CD, FD, MO, or a communication medium such as a network for a general-purpose computer system capable of executing various program codes in a computer-readable format.

By providing such a program in a computer-readable format, processing according to the program is realized on a computer system.

In addition, the present invention is not limited to an apparatus for quality assurance of an automobile component using a marker of the second embodiment described above, but may be applied to a system composed of a plurality of devices or to a device composed of a single device.

It can be done by providing the recording medium storing the program code of the software that realizes the functions of the above-described second embodiment to a system or device, and the computer (or CPU or MPU) of the system or device reads the program code stored in the recording medium.

In this case, the program code itself read out from the recording medium realizes the functions of the second embodiment described above, and the recording medium storing the program code constitutes the present disclosure.

As a recording medium for supplying the program code, for example, a floppy disk, hard disk, optical disk, optical magnetic disk, CD-ROM, CD-R, magnetic tape, nonvolatile memory card, ROM can be used.

Further, by executing the program code read by the computer, the functions of the above-described second embodiment are not only realized, but an operating system (OS) or the like operating on the computer based on the instruction of the program code is actually executed. A part or all of processing may be performed, and the function of the above-described embodiment may be realized by the processing.

Further, after the program code read from the recording medium is recorded in a memory provided in a function expansion board inserted into a computer or a function expansion unit connected to a computer, the expansion function is expanded or expanded based on the instructions of the next program code. It may also be included when the CPU or the like provided in the unit performs processing to perform part or all of the actual processing, and the functions of the second embodiment described above are realized by the processing.

That is, the recording medium according to the present invention is equipped with a program executable on a computer.

In such a recording medium, recorded are, a function of shooting a fully assembled component via an image taking unit 100 driven according to an operation of a terminal having a shooting function; and a function of receiving the taken image and using an image processing function to specify the dimensions of the fully assembled components according to the difference in size and shape between the marker M and the fully assembled component, and then using the marker M to correct and output as a basic image, via an image pre-processing unit 200.

In addition, a function of receiving the corrected basic image and performing a measurement site metrology algorithm 310 for the distance and step of the component, via a distance and step measurement unit 300; a function of receiving and storing measurement data on the measured distance and step, via a measurement data storage unit 400; and a function of receiving and displaying the corrected basic image and the measurement data on the measured distance and step, via an image output device 500 are recorded.

In addition, in the recording medium according to the present disclosure, recorded is a measurement site metrology algorithm 310 which includes a function of detecting an edge of a measurement site of the component from the corrected basic image; a function of estimating a vertical line, a base point of which is a measurement reference point set based on the detected edge; a function of detecting an intersection point of the estimated vertical line and a relative reference point of the component; and a function of measuring the length of the vertical line, and calculating an absolute length of the vertical line relative to an absolute length of the marker M.

In addition, recorded is a function in which, when the measurement mode selected by the distance and step measurement unit 300 is a manual measurement mode, the measurement site is enlarged and displayed, and the measurement site and interval are adjusted using a measurement site editing cursor and an interval display bar.

In addition, recorded is a function in which the absolute dimension of the measurement site of the component is obtained is recorded through a dimension analysis in which the marker M is provided for two-dimensional accumulation measurement.

In addition, the method for quality assurance of an automobile component using the marker according to the present disclosure described above may be implemented via a computer-readable code and recorded on a recording medium.

As described above, the present disclosure is a compensation technique according to the shooting distance of a high-resolution camera of a terminal having a function of shooting the quality of automobile components, a reference measurement technique including spatial information and measurement specifications in the marker itself, and distortion correction of a taken image. Provides a method and device for quality assurance of an automobile component using markers that can remove human errors and apply a user-oriented display method by utilizing the image analysis technology, and provides a template (T) for customized reference.

Through this, the present disclosure acquires an image of the fully assembled component using a high-resolution camera and a reference measurement technique of a terminal having a shooting function, so it is convenient to measure the distance and the step of the component, and through the inverse affine transformation, size conversion, parallel movement, and The measurement accuracy is improved because the taken image can be corrected to a basic image flexibly through rotation movement.

In addition, the inconvenience of portability of a conventional contact type measuring instrument is eliminated, and the marker itself can include information such as spatial information and measurement specifications, and by developing a customized reference template T, it is possible to replace the import of contact type precision measuring instruments that rely on imports.

In addition, since the quality information on components can be made into a database (DB) and it is possible to share information between involved persons of component manufacturing companies and suppliers, the time and effort required to review and improve the quality analysis of major components is reduced, thereby improving efficiency of components quality management.

In addition, since it is easy to detect abnormalities in quality for components early on and it is possible to form a reliability and transparency for the components, product reliability and productivity are improved.

In addition, since it is possible to utilize a terminal with a generalized shooting function, when compared to a non-contact mechanical quality inspection system such as an optical method using a projector or an optical microscope, an inspection device using a proximity sensor, and a measuring device using a laser and the like, there is no need to purchase expensive components inspection equipment, and ubiquitous measurement can be performed anytime, anywhere.

In the above, although embodiments were exemplified in which an automobile part assembly state can be checked, hole size and hole depth can be measured, and detailed components for preventing leaking can be checked, the present disclosure can be used not only the automotive industry, but also in the assembly field in all industries such as electrical, electronic, mechanical, heavy industry, and the like, and it can also be used in all processing fields such as unprocessed holes, tool breakage, and displacement from general components processing.

In addition, the present disclosure may include not only a portable terminal, but also a fixed terminal such as a CCTV or IP (Internet Protocol) camera with a shooting function.

In other words, the present disclosure can be applied to physical dimension analysis in the process of selecting agricultural and marine products, thereby accurately selecting agricultural and marine products through a fixed terminal based on quantified values rather than visual identification, thereby reducing time and manpower required for quality improvement.

Although the preferred embodiments of the present disclosure have been described as examples, the description of the various embodiments described in "Detailed Description of the Embodiments" is exemplary, and those skilled in the art to which the present invention pertains may easily understand that the present invention may be variously modified or the equivalents thereof may be carried out.

Further, the present disclosure is not limited to the description because it may be implemented in various other forms, and the above description is provided to fully inform those skilled in the art to which the present disclosure pertains of the scope of the present disclosure to fully deliver the disclosed contents of the present disclosure, and it is noted that the present disclosure is defined only by the attached claims.

The invention claimed is:

1. A method for quality assurance of an automobile component using a marker, comprising:
   (a) shooting a fully assembled component to which a marker having a predetermined shape is pre-attached, via an image taking device driven according to an operation of a terminal having a shooting function;

(b) receiving the taken image from the image taking device and using an image processing function to specify the dimensions of the fully assembled component according to the difference in size and shape between the marker and the fully assembled component, and then using the marker to correct and output as a basic image, via an image pre-processor;

(c) receiving the corrected basic image from the image pre-processor and performing a measurement site metrology algorithm to measure a distance and a step of the component, via a distance and step measurement processor;

(d) receiving and storing measurement data on the measured distance and step from the distance and step measurement processor, via a measurement data storage device; and (e) receiving the corrected basic image from the image pre-processor and receiving and displaying the measurement data from the measurement data storage device, via an image output device, wherein the measurement site metrology algorithm uses an intersection point of a vertical line, base point of which is a measurement reference point for a measurement site of the component, and a relative reference point in the corrected basic image from the image pre-processor, to calculate an absolute length of the vertical line relative to an absolute length of the marker to measure the distance and step of the component.

2. A method for quality assurance of an automobile component using a marker, comprising:

(a) shooting a fully assembled component to which a marker having a predetermined shape is pre-attached, via an image taking device driven according to an operation of a terminal having a shooting function;

(b) receiving the taken image from the image taking device and using an image processing function to specify the dimensions of the fully assembled component according to the difference in size and shape between the marker and the fully assembled component, and then using the marker to correct and output as a basic image, via an image pre-processor; and (c) receiving the corrected basic image from the image pre-processor and selecting a measurement mode, and performing a measurement site metrology algorithm to measure a distance and a step of the component, via a distance and step measurement processor;

wherein when the selected measurement mode from the distance and step measurement processor is a manual measurement mode, a measurement site is enlarged and displayed, and the measurement site and interval are adjusted using a measurement site editing cursor and an interval display bar.

3. The method of claim 2,
wherein in the (b) step,
an inverse affine transformation is performed on the taken image to be corrected into the basic image via size transformation, parallel movement, and rotational movement.

4. A method for quality assurance of an automobile component using a marker, comprising:

(a) shooting a fully assembled component to which a marker having a predetermined shape driven by an operation of a terminal having a shooting function by an image taking device;

(b) receiving the taken image from the image taking device and using an image processing function to specify the dimensions of the fully assembled component according to the difference in size and shape between the marker and the fully assembled component, and then using the marker to correct and output as a basic image, via an image pre-processor; and (c) receiving the corrected basic image from the image pre-processor and performing a measurement site metrology algorithm to measure a distance and a step of the component, via a distance and step measurement processor;

wherein the measurement site metrology algorithm comprises, detecting an edge of a measurement site of the component from the corrected basic image from the image pre-processor;

estimating a vertical line, a base point of which is a measurement reference point set based on the detected edge;

detecting an intersection point of the estimated vertical line and a relative reference point of the component;

measuring the length of the vertical line, and calculating an absolute length of the vertical line relative to an absolute length of the marker; and measuring a distance and a step of the component based on the calculated absolute length of the vertical line.

5. An apparatus for quality assurance of an automobile component using a marker, comprising:

an image taking device that is driven according to an operation of a terminal having a shooting function and shoots a fully assembled component to which a reference template including a marker of a predetermined shape is pre-attached;

an image pre-processor that receives the taken image from the image taking device and uses an image processing function to specify the dimensions of the fully assembled component according to the difference in size and shape between the marker and the fully assembled component and then uses the marker to correct and output as a basic image; and a distance and step measurement processor that receives the corrected basic image from the image pre-processor and performs a measurement site metrology algorithm to measure a distance and a step of the component;

wherein in the marker, information about measurement specifications according to the measurement purpose of a measured object is encoded and stored, and an absolute dimension of a measurement site of the component is obtained through dimension analysis provided for a two-dimensional accumulation measurement.

6. The apparatus of claim 5,
wherein the marker stores spatial information on variables necessary for correcting the taken image.

7. The apparatus of claim 5,
wherein the image pre-processor performs an inverse affine transformation on the taken image to correct into the basic image via size transformation, parallel movement, and rotational movement.

8. An apparatus for quality assurance of an automobile component using a marker, comprising:

an image taking device that is driven according to an operation of a terminal having a shooting function and shoots a fully assembled component to which a reference template including a marker of a predetermined shape is pre-attached;

an image pre-processor that receives the taken image from the image taking device and uses an image processing function to specify the dimensions of the fully assembled component according to the difference in size and shape between the marker and the fully assembled component and then uses the marker to correct and output as a basic image;

a distance and step measurement processor that receives the corrected basic image from the image pre-processor and performs a measurement site metrology algorithm to measure a distance and a step of the component;

a measurement data storage device that receives and stores measurement data on the measured distance and step from the distance and step measurement processor; and an image output device that receives the corrected basic image from the image pre-processor and receives and displays the measurement data from the measurement data storage device;

wherein the marker is of a matte metal or synthetic resin material.

9. The apparatus of claim 8,
wherein the marker stores the spatial information on variables necessary for correcting the taken image.

10. The apparatus of claim 8,
wherein the image pre-processor performs an inverse affine transformation on the taken image to correct into the basic image via size transformation, parallel movement, and rotational movement.

11. The apparatus of claim 8,
wherein the reference template is of a transparent silicon plate material.

* * * * *